(12) United States Patent
Poikselka

(10) Patent No.: US 7,650,159 B2
(45) Date of Patent: Jan. 19, 2010

(54) COMMUNICATION SYSTEM

(75) Inventor: Miikka Poikselka, Espoo (FI)

(73) Assignee: Nokia Corporation, Espoo (FI)

( * ) Notice: Subject to any disclaimer, the term of this patent is extended or adjusted under 35 U.S.C. 154(b) by 628 days.

(21) Appl. No.: 10/981,701

(22) Filed: Nov. 5, 2004

(65) Prior Publication Data

US 2006/0031294 A1 Feb. 9, 2006

(30) Foreign Application Priority Data

Jun. 22, 2004 (GB) ................... 0413972.1

(51) Int. Cl.
H04B 7/00 (2006.01)
(52) U.S. Cl. .................. 455/518; 455/517; 455/519
(58) Field of Classification Search ............. 455/518
See application file for complete search history.

(56) References Cited

U.S. PATENT DOCUMENTS

| | | | |
|---|---|---|---|
| 2002/0077136 A1* | 6/2002 | Maggenti et al. .......... 455/518 |
| 2002/0110227 A1 | 8/2002 | Bedingfield et al. | |
| 2003/0018721 A1* | 1/2003 | Gupta et al. ............. 709/206 |
| 2003/0224756 A1* | 12/2003 | Kallio et al. ............. 455/411 |
| 2004/0057405 A1 | 3/2004 | Black | |
| 2004/0203630 A1* | 10/2004 | Wang ..................... 455/414.1 |
| 2005/0276268 A1* | 12/2005 | Poikselka et al. ........ 370/395.2 |
| 2008/0096585 A1* | 4/2008 | Willey .................... 455/458 |

OTHER PUBLICATIONS

C. Jennings—Cisco Systems; J. Peterson—NeuStar, Inc.; M. Watson—Nortel Networks, "Private Extensions to the Session Initiation Protocol (SIP) for Asserted Identity within Trusted Networks", Nov. 2002, pp. 1-19.
J. Peterson—NeuStar, "A Privacy Mechanism for the Session Initiation Protocol (SIP)", Nov. 2002, pp. 1-23.
Open Mobile Alliance, "Push to talk over Cellular (PoC)—Architecture" XP-002347530, Jun. 8, 2004, pp. 1-121.

* cited by examiner

*Primary Examiner*—Yuwen Pan
*Assistant Examiner*—Ankur Jain
(74) *Attorney, Agent, or Firm*—Ditthavong Mori & Steiner, P.C.

(57) ABSTRACT

A communication system comprising: a first and second user equipment for communication over a shared floor; a controlling server for managing the shared floor; and at least one participating server for serving said first user equipment; the participating server being arranged to detect a connection request from said first user, and to insert into the connection request from the first user equipment a token; and wherein the controlling server is arranged to detect said inserted token and to route user plane messages via the participating server responsive to said received token.

19 Claims, 3 Drawing Sheets

COMMUNICATION SYSTEM

FIELD OF THE INVENTION

The present invention relates to a communication system and in particular but not exclusively to a communication system for use in a push-to-talk over cellular network.

BACKGROUND OF THE INVENTION

A communication system can be seen as a facility that enables communication sessions between two or more entities such as user equipment and/or other nodes associated with the communication system. The communication may comprise, for example, communication of voice, data, multimedia and the like. A session may, for example, be a telephone call type session between users, a multi-way conference session, or a communication session between user equipment and an application server (AS) such as a service provider server.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of rules on which the communication can be based is defined to enable communication.

Communication systems providing wireless communication for user equipment are known. An example of a wireless system is the public land mobile network (PLMN). PLMNs are commonly based on cellular technology. In cellular systems, a base transceiver station (BTS) or similar access entity services mobile user equipment (UE) via a wireless interface between these entities. The communication on the wireless interface between the user equipment and elements of the communication network can be based on an appropriate communication protocol. The operation of the base station apparatus and other apparatus required for the communication can be controlled by one or several control entities. The various control entities may be interconnected.

One or more gateway nodes may be provided for connecting the cellular access network to other networks, for example to a public switched telephone network (PSTN) and/or other communication networks such as an IP (Internet Protocol) and/or other packet switched data networks. In such arrangements, the mobile communications network provides an access network enabling a user with wireless user equipment to access external networks, hosts, or services offered by specific service providers.

An example of the type of services that may be offered to a user such as a subscriber to a communication system is the so called multimedia service. Some of the communication systems enabled to offer multimedia services are known as internet protocol multimedia networks. IP multimedia functionalities can be provided by means of an IP multimedia core network subsystem (IMS). The IMS includes various network entities for the provision of multimedia services. IMS services are intended to offer, amongst other services, IP based packet data communication sessions between mobile user equipment.

In a packet data network, a packet data carrier may be established to carry traffic flows over the network. An example of such a packet data carrier is a packet data protocol (PDP) context.

Various types of services are provided by means of different application servers (AS) over IMS. Some of these services may be time critical. An example of a time critical service that may be provided over the IMS is the so-called direct voice communication service. One example of this type of service is the 'push-to-talk over cellular' (PoC) service also known as the PTT (push-to-talk service). The direct voice communication services are intended to use the capabilities of the IMS to enable IP connections for user equipment and other parties to the communication, such as other user equipment or entities associated with the network. The service allows users to engage in immediate communication with one or more users.

The principle behind push-to-talk over cellular (PoC) communication systems is one where the capabilities of a walkie-talkie system are implemented within a standard cellular phone. Users simply select the person or groups of persons they wish to talk to from their phone and press the push to talk key on their mobile phone to start talking. The activation may be via a specific button, tangent or any other appropriate key of the keyboard. Similar principals apply with devices having touch sensitive or sound activated user interfaces. While the user speaks, the other user or users may listen. Bi-directional communication may be offered since all parties of the communication session may similarly communicate voice data with the PoC application server. Turns to speak are requested by activating the push to talk button or the like. The response time of connection is almost instantaneous.

Push-to-talk calls are typically half-duplex communications, i.e. while one user speaks the others listen. The turn to speak is granted by pressing the push-to-talk key on a first come first served basis or based on priorities. Push-to-talk calls are usually connected without the recipient answering and typically received through the phone's built in loud speaker.

As this system is integrated within the cellular telecommunication system this provides a coverage area greater than that provided using traditional two-way radio systems. The push-to-talk service may be implemented using push-to-talk servers in a IP multimedia subsystem (IMS) system. The push to talk service is based on multi-unicasting. Each transmitting handset sends packet data traffic to a dedicated push-to-talk server (a participating server). A controlling server receives the traffic and manages the shared floor for a group call. The controlling server duplicates the traffic to be received by all recipients. No multi-casting is performed either in the GPRS access network or over the radio access network.

The push to talk over cellular telecommunication system such as described within the push to talk over cellular draft provisions such as the 'OMA Push to talk over Cellular (PoC)—Architecture'.

Groups of communicating user equipment using the PoC system can be created in various ways. The Internet Engineering Task Force (IETF) defines one such system using session initiation protocol (SIP) or Conference Policy Control Protocol (CPCP). Voice and data control traffic once the groups are set up is carried through a real time protocol (RTP) streaming bearer. The PoC system uses transport protocols based on those described in IETF RFC 3550. The RTP protocol describes the architecture of the data packets and the syntax of the data stored within the packets passing the voice and data information from user to user.

The issue of privacy and anonymity over a PoC network has only recently been perceived as a problem. A user of a PoC network may wish to send a message and withhold their identity from the final destination whilst still being able to communicate an identity to one or more intermediaries. Furthermore due to legal reasons, i.e. identity fraud and identification of criminal behaviour, whilst the user may wish to remain anonymous from other users a log of the users activity may have to be stored at the receiving users domain.

Although there exists some SIP protocols for example ITEF RFC 3323 and ITEF RFC 3325 which enable users to withhold their identity whilst setting up an IMS connection there has been no discussion of how the data in a PoC network maintains the user's anonymity.

U.S. application (PWF Ref:306307VRD/GJS) describes a system for enabling a user, having joined a group, to request to talk within a group while also requesting that their identity is hidden from the other members of the group. This is carried out while still transmitting their identity to the participating and controlling servers of the push-to-talk over cellular (PoC) system over the user plane.

However this method of achieving anonymity is complicated by the control plane/user plane signalling system. Some systems can be configured to allow user plane messages, in other words the control and media messages, to pass directly from the controlling PoC server to the user equipment without passing via a 'local' participating PoC server. In such a system the control plane messages, i.e. the initiation messages to set up the user plane, typically passes from the controlling PoC server to the 'local' participating server to the user equipment and vice versa.

In such a system the 'local' participating server has no knowledge that the user has requested anonymity and therefore is unable to log and store such a request.

It is the aim of embodiment of the present invention to address or at least mitigate the problems described above.

SUMMARY OF THE INVENTION

There is provided according to the present invention a communication system comprising: a first and second user equipment for communication over a shared floor; a controlling server for managing the shared floor; and at least one participating server for serving said first user equipment; the participating server being arranged to detect a connection request from said first user, and to insert into the connection request from the first user equipment a token; and wherein the controlling server is arranged to detect said inserted token and to route user plane messages via the participating server responsive to said received token.

The token is preferably in the header of the connection request.

The token is preferably a character string within the header.

The string is preferably the string 'media' within the server header.

The string may be the string 'media' within the contact header.

The first user equipment is preferably arranged to initiate a connection request with the second user equipment via said server means using a first protocol.

The first protocol is preferably a session initiation protocol (SIP).

The first user equipment is preferably arranged to communicate over an existing connection with said second user equipment via said server means using a second protocol.

The second protocol is preferably a real time control protocol (RTP/RTCP).

The user plane messages are preferably transmitted using said second protocol.

The communications system may comprise a push-to-talk over cellular communications system.

The controlling server may comprise means for storing said inserted token.

The system may further comprise: at least one further participating server for serving said second user equipment; wherein the controlling server may be further arranged to detect an anonymity request from the first user equipment, and a second token from the further participating server wherein in a first mode of operation responsive to detecting said second token the controlling server is preferably arranged to insert into user plane messages from the first user equipment a privacy indication, and the participating server is preferably responsive to said privacy indication to remove information about the first user equipment from the user plane message.

The system may preferably in a second mode of operation be responsive to not detecting said second token the controlling server being preferably arranged to remove information about the first user equipment from the user plane message.

According to a second aspect of the present invention there is provided a server arranged to operate in a communications system, said communications system further comprising a first and second user equipment in communication over a shared floor, and a further server arranged to control the shared floor, wherein said server is arranged to detect a connection request from said first user, and to insert into the connection request from the first user equipment a token; and wherein the further server is arranged to detect said inserted token, the further server being arranged to route user plane messages via the participating server responsive to the received token.

According to a third aspect of the present invention there is provided a method of communication within a communications system comprising, a first and second user equipment in communication over a shared floor, a first server and a further server arranged to manage the shared floor, said method comprising the steps of: receiving at said first server a connection request, inserting a token into the connection request; transmitting the connection request containing the inserted token to the further server; configuring the routing of the user plane messages to pass through the first server responsive to receiving the inserted token.

The method may further comprise the step of: receiving at said further server an anonymity request from said second user equipment.

The further server managing the shared floor may maintain information about the second user equipment in user plane messages prior to transmitting to the first user equipment when the inserted token is present at the further server.

The further server managing the shared floor may remove information about the second user equipment from user plane message prior to transmitting to the first user equipment when the inserted token is not present at the further server.

BRIEF DESCRIPTION OF THE DRAWINGS

For a better understanding of the present invention and how the same may be carried into effect, reference will now be made by way of example only to the accompanying drawings in which.

DETAILED DESCRIPTION OF EMBODIMENTS OF THE PRESENT INVENTION

Certain embodiments of the present invention will be described by way of example, with reference to the exemplifying architecture of a third generation (3G mobile communication system). However it will be understood that embodiments may be applied to any other suitable forms of communication system.

The third generation partnership project (3GPP) has defined a reference architecture for the third generation (3G) core network which will provide the users of user equipment with access to multimedia services. This core network is divided into three principal domains. These are the circuit switched (CS) domain, the packet switched (PS) domain and the internet protocol multimedia subsystem (IMS) domain.

Figure 1:
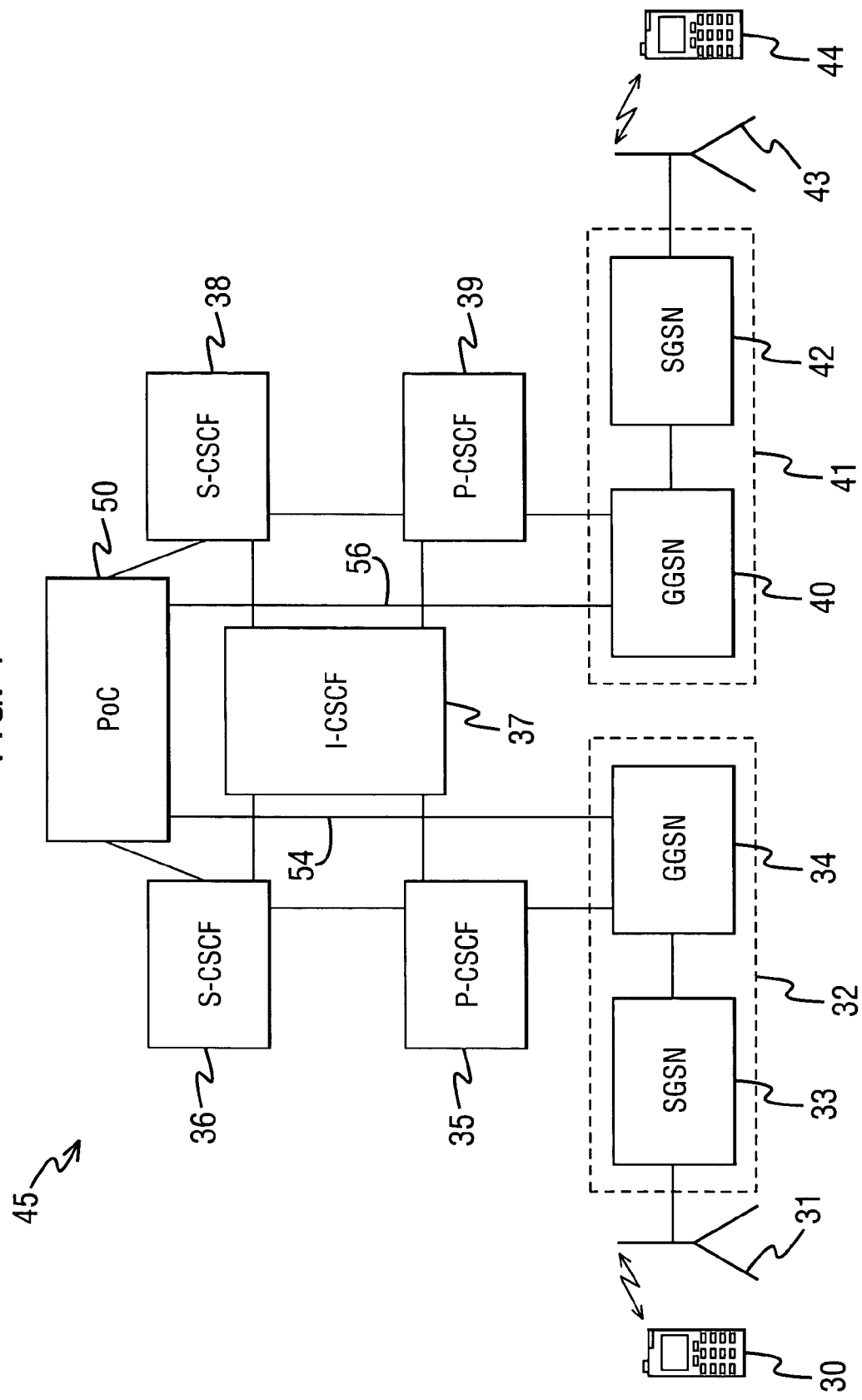
FIG. 1 shows a schematic view of a typical communications network incorporating an embodiment of the present invention.

FIG. 1 shows an IP multimedia network 45 for offering IP multimedia services to IP multimedia network subscribers. IP multimedia subsystem (IMS) functionalities may be provided by a core network (CN) subsystem including various entities for the provision of the service. The third generation partnership project (3GPP) has defined the use of the general packet radio service (GPRS) for offering IP connectivity to IMS services. Accordingly, a GPRS based system will be used in the following example of a possible backbone communication network enabling the IMS services.

A mobile communication system such as the 3G cellular system is typically arranged to serve a plurality of mobile user equipment, usually via a wireless interface between the user equipment and base stations of the communication system. The mobile communication system may logically be divided between a radio access network (RAN) and a core network (CN). The core network entities typically include various control entities and gateways for enabling the communication via a number of radio access networks and also for interfacing a single communication system with one or more communication systems such as with other cellular systems and/or fixed line communications systems.

In FIG. 1, the intermediate mobile communication network provides packet switched data transmission in the packet switched domain between a support node 33,42 and mobile user equipment 30,44. Different sub networks are in turn connected to an external data network, for example to a packet switched data network (PSDN) via gateway GPRS support nodes (GGSN) 34, 40. The GPRS services thus allow transmission of packet data between mobile data terminals and/or external data networks. More particularly, the exemplifying general packet radio services operation environment comprise one or more sub network service areas, which are interconnected by GPRS back bone networks 32 and 41. A sub network comprises a number of packet data service nodes (SN). In this embodiment, the service nodes will be referred to as serving GPRS support nodes (SGSN). Each of the SGSNs 33, 42 is connected to at least one mobile communication network, typically to base station systems 31,43. Although not shown for clarity reasons, the connection may be provided by way of radio network controllers or other access system controllers such as base station controllers in such a way that packet services can be provided for mobile user equipment via several base stations.

Base stations 31 and 43 are arranged to transmit signals to and receive signals from mobile user equipment 30 and 44 of mobile users i.e. subscribers, via respective wireless interfaces. Correspondingly, each of the mobile user equipment is able to transmit signals to and receive signals from the base stations via the wireless interface. In the simplified representation of FIG. 1, the base stations 31 and 43 belong to respective radio access networks (RAN). In the arrangement shown, each of the user equipment 30 and 44 may access the IMS network 45 via the two access networks associated with the base stations 31 and 43 respectively. It should be appreciated that, although FIG. 1 only shows the base stations of two radio access networks, a typical mobile communication network usually includes a number of radio access networks.

The IMS domain is for ensuring that multimedia services are adequately managed. The IMS domain commonly supports the session initiation protocol (SIP) as developed by the internet engineering task force (IETF). Session initiation protocol (SIP) is an application-layer control protocol for creating, modifying and terminating sessions with one or more participants (end point). SIP was generally developed to allow for the initiation of a session between two or more end points in the Internet by making these end points aware of the session semantics. A user connected to an SIP base communication system may communicate with various entities of the communication system based on standardised SIP messages. User equipment or users that run certain applications on the user equipment are registered with the SIP backbone so that an invitation to a particular session can be correctly delivered to these end points. SIP provides a registration mechanism for devices and users and it applies mechanisms such as location servers and registrars to route the session invitations appropriately. Examples of proper possible sessions that may be provided by SIP signalling include internet multimedia conferences, internet telephone calls and multimedia distribution.

User equipment within the radio access network may communicate with a radio network controller via radio network channels which are typically referred to as radio bearers. Each user equipment may have one or more radio channels open at any one time with the radio network controller. Any appropriate mobile user equipment adapted for internet protocol (IP) communication maybe used to connect to the network. For example, a user may access the cellular network by means of user equipment such as a personal computer, personal data assistant (PDA), mobile station (MS), portable computer, combinations thereof or the like.

User equipment is used for tasks such as making and receiving phone calls, for receiving and sending data from and to a network and for experiencing for example multimedia content. User equipment is typically provided with a processor and memory for accomplishing these tasks. User equipment may include an antenna for wirelessly receiving and transmitting signals from and to base stations of the mobile communication network. User equipment may also be provided with a display for displaying images and other graphical information for the user of the mobile user equipment. A speaker may also be provided. The operation of the user equipment may be controlled by means of a suitable user interface such as key pad, voice commands, touch sensitive screen or pad, combinations thereof or the like.

The user equipment 30 and 44 of FIG. 1 are configured to enable the use of push to talk types of services. An activation function that may be required by a push to talk service can be provided by one of the buttons on the keypad of the mobile station 30 and 44 or by a specific key or button such as the type known from—'walkie-talkie' devices.

It should be appreciated that FIG. 1 only shows two user equipment for clarity. In practice, a number of user equipment may be in simultaneous communication with each base station. User equipment may have several simultaneous sessions, for example a number of SIP sessions and activated PDP contexts. For example, the user may have a phone call and be simultaneously connected to at least one other service.

Overall communication between user equipment in an access entity and the GGSN is provided by a PDP context. Each PDP context provides a communication pathway between a particular user and a GGSN. Once the PDP context is established, it can typically carry multiple flows. Each flow normally represents, for example, a particular service and/or media component of a particular service. The PDP context therefore often represents a logical communication pathway for one or more flows across the network. To implement the PDP context between user equipment and the serving GPRS support node, radio access bearers need to be established which commonly allow for data transfer for the user equipment.

Communication systems have developed such that services may be provided for user equipment by means of various functions of the IMS network 45 that are handled by network entities and served by the servers. In the current 3G wireless multimedia network architectures, it is assumed that several different servers are for handling different functions. These include functions such as the call session control functions (CSCF). The call session control functions can be divided into various categories such as a proxy call session control function (P-CSCF) 35, 39, interrogating call session control function (I-CSCF) 37 and serving call session control function (S-CSCF) 36, 38.

The user equipment 30, 44 may connect via the GPRS network to application servers that are generally connected to the IMS. In FIG. 1, such an application server is provided by a push-to-talk-over cellular (PoC) services server 50. The PoC server can in some embodiments of the present invention be implemented as server means comprising a series of participating PoC servers connected to a controlling PoC server. The participating PoC servers transmit and receive data traffic from the user equipment and also transmit and receive data traffic from the controlling PoC server. The controlling PoC server transmits and receives data traffic from the participating PoC servers and controls access to the PoC shared floor dependent on the information received from the participating servers. In a further embodiment of the present invention one participating PoC server also acts as a controlling PoC server.

Figure 2:
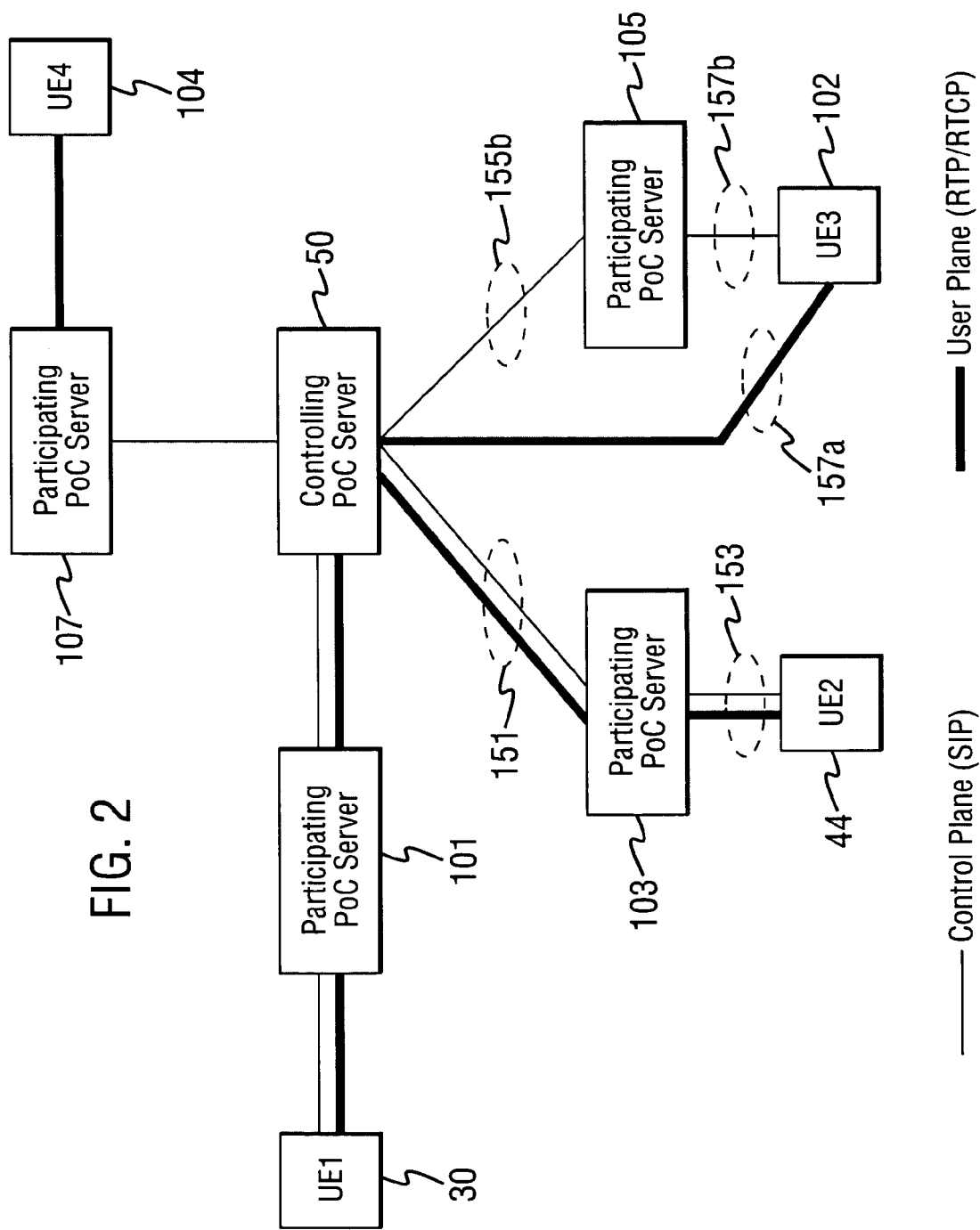
FIG. 2 shows a schematic view of the push-to-talk communications network as implemented within the communications network of FIG. 1 showing typical user plane and control plane pathways.

FIG. 2 shows a further view of the communications system of FIG. 1 with regards to the push-to-talk over cellular (PoC) system. FIG. 2 shows a network of user equipment units UE1 30, UE2 44, UE3 102, UE4 104 communicating over a push-to-talk over cellular telecommunication system.

UE1 30 is connected to the first participating PoC server 101, which is connected to the controlling PoC server 50. UE2 44 is connected to the second participating PoC server 103 which is connected to the controlling PoC server 50. In the examples of UE1 30 and UE2 44 the control plane messages and the user plane messages are routed via the participating server. Thus the user plane and control plane messages from UE2 to controlling PoC server 50 are routed via the participating PoC server 103 via connection 153, and 151. The messages though are not fixed and can be routed via separate paths for any node other than the participating PoC server 103.

UE3 102 shows the other situation where the user plane messages do not pass through the participating server. In this situation the UE3 103 control plane messages are connected via a first connection 157b to the third participating PoC server 105 which is connected via a second connection 155b to the controlling PoC server 50. However UE3 user plane messages are connected via a third connection 157a to the controlling PoC server 50 without passing through the third participating server 105.

UE4 104 is shown in the example of FIG. 2 to be initiating a connect to the PoC system and is shown with a control plane connected to the fourth participating PoC server 107 which is connected to the controlling PoC server 50.

In such a system the mobile user equipment UE1, UE2, UE3, and UE4 can be from four different IMS networks.

The PoC participating servers 101, 103, 105, 107 and controlling PoC server 50 provide push-to-talk over cellular (PoC) services over the IMS network 45. The push-to-talk service is an example of the so called direct voice communication service. Users who wish to use the PoC service may need to subscribe to an appropriate PoC server.

The direct voice communication services are intended to use the capabilities of the GPRS back bone and the control functions of the multimedia subsystem for enabling IP connections with the user equipment UE1 30, UE2 44, UE3 102, UE4 104. The PoC server may be operated by the operator of the IMS system or a third party service provider.

As is shown in FIG. 2 once the control plane has established a connection need not necessarily use the participating PoC servers 101, 103, 105, 107 to control the system or participate in the communication of the media.

Thus once the system has been initiated a user may open the communication link, for example, by pressing a specific activation button on the user equipment UE1 30. While the user of the UE1 30 speaks, the users of UE2 44, UE3 102, and UE4 104 listen. The user of the user equipment UE2 44 may then reply in a similar manner. The signalling between the user equipment and the appropriate call session control functions is routed via the GPRS network. The user plane session sets up signalling for the user equipment and may be routed via the participating PoC servers 101, 103 and controlled by the controlling PoC server 50.

In other words, the controlling PoC server 50 controls both the control plane (for signalling) and the user plane (for user data) of the PoC user. The participating PoC servers 101, 103, 105 and 107 are used to assist in the routing of the control plane messages to the associated user equipment, and can possibly be used in assisting in routing the user plane messages to the associated user equipment.

The control plane traffic between the participating PoC server and the user equipment may be routed via the IMS whilst the user plane traffic between the user equipment and the PoC server may be routed from the GPRS system to the PoC server on interfaces 54 and 56 (as shown in FIG. 1).

As discussed earlier the push-to-talk service is based on multi-unicasting. Each transmitting user equipment UE1 30, UE2 44, UE3 102, UE4 104 sends packet data traffic to a dedicated push-to-talk server and in case of a group call, the server then duplicates the traffic to all recipients. In order to control the communications system 'user plane' messages can be passed from one user to the rest of the system and vice versa. One type of data communications packet in the user plane is that of informing which user is transmitting or has received permission to use the floor. This information could be a 'floor taken' message. This 'floor taken' information is received by the user equipment which will receive RTP traffic from the user who has taken control of the floor. These control packets are based on a real time control protocol (RTCP) packet, a subset of the real time protocols (RTP) described earlier.

In order to aid the understanding of the present invention we shall describe a situation where the users UE1 30, UE2 44, UE3 102, and UE4 104 are involved in a group communication, and the user using user equipment UE4 104 wishes to talk whilst requesting that his/her identity is hidden from the others.

Figure 3:
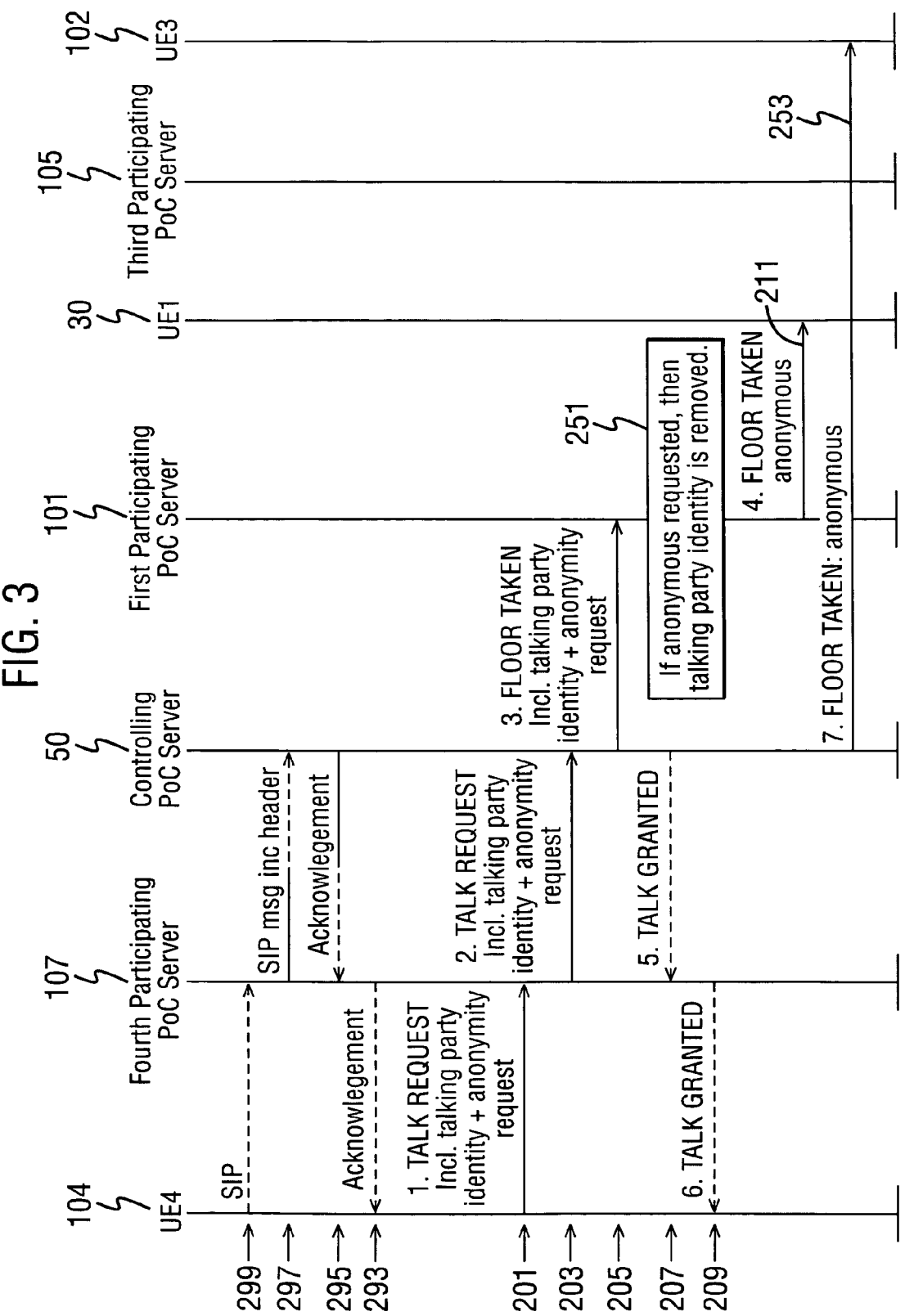
FIG. 3 shows a flow diagram of the control plane and user plane messages incorporating a first embodiment of the present invention.

With regards to FIG. 3 a flow diagram is shown describing an embodiment of the present invention in action.

In the first initialisation, or control plane, step 299 the UE4 104 transmits a first Session initiation Protocol message to the PoC participating server A 107.

The fourth participating PoC server 107 receives the message and prepares it to be transmitted to the controlling PoC server 50. In order that the fourth participating PoC server 107 is arranged to remain within the path for any control messages once the system has been initiated the fourth participating PoC server 107 is arranged to add or amend the server header within the SIP message. For example the fourth participating PoC server 107 contains the tag or token indicating that the user plane media path must pass through the participating PoC server 107

Server: PoC-serv/media:

Where 'media' indicates that the server is within the media path. In step 297 the fourth participating PoC server 107 forwards the amended message to the controlling PoC server 50.

In some embodiments of the present invention the controlling PoC server 50 stores the received tags or tokens indicating that the user plane media path must pass through the participating server.

In step 295 the controlling PoC server 50 has received the message and following any authentication and authorisation procedure configures the system so that user plane messages are passed via the fourth participating PoC server 107. An acknowledgement message is then passed back to the fourth participating PoC server 107.

In step 293 the fourth participating PoC server 107 receives the acknowledgement message and passes the message onto the UE4 104.

The PoC system is now arranged to allow UE4 104 to communicate with the previously initiated users UE1 30, UE2 44, UE3 102. Furthermore the 'local' participating server 107 is automatically in the path for any control messages—allowing other users to request anonymity whilst storing a record of the other user's identity for future reference and legal purposes.

An example of the effect of the embodiment of the present invention is now shown with respect to UE4 104 requesting a talk request containing an anonymity request. In the example shown the receiving users UE1, UE2, UE3 are using the setup shown in the FIG. 2. Therefore user plane messages directed to the user equipment UE1 automatically pass via the first participating PoC server 101, in the same way that user plane messages directed to the user equipment UE2 and UE4 pass via the second participating PoC server 103 and fourth participating PoC server 104 respectively. However, user plane messages directed to the user equipment UE3 102 are sent directly from the controlling server x 50 to the UE3 102.

In the first user plane step 201 the UE4 104 transmits a 'talk request' message to the participating PoC server 107. This 'talk request' message includes the talking party or user identity of the UE4 and an anonymity request.

The second user plane step 203 occurs after the participating PoC server 107 has received the talk request. In this step the participating PoC server 107 forwards the 'talk request' including the talking party identity and the anonymity request to the controlling PoC server X 50.

The controlling PoC server X 50 may carry out further authorisation of the client to determine that the client is authorised to participate in the PoC communications group. If the PoC Client 104 is permitted to talk i.e. there is no other user occupying the floor then the controlling PoC server 50 initiates further user plane steps 205, 253 and 207.

The controlling PoC server's initiated user plane step 205 is where the controlling PoC server 50 forwards a 'floor taken' message to the first participating PoC server 101. The 'floor taken' message includes the talking party identity together with the anonymity request from client A 104 as the controlling PoC server 50 is aware that the first participating PoC server 101 is present in the user plane path. The controlling PoC server 50 is aware of this due to presence of the tag or token in the SIP message when the user joined in the group. In a similar manner the controlling PoC server 50 forwards a 'floor taken' message to the second participating PoC server 103 as once again the controlling PoC server is aware that the second participating PoC server 103 is present in the user plane path from controlling PoC server 50 to UE2 44.

The controlling PoC server 50 user plane step 253 is where the controlling PoC server 50 sends a 'floor taken' message to UE3 102. As the controlling PoC server 50 recognises the anonymity request and is aware that the third participating PoC Server 105 is not present in the user plane path, the controlling PoC server 50 generates a new 'floor taken' message. The controlling PoC server 50 then transmits this new 'floor taken' message containing no identifying features of the user to the UE3 102.

The controlling PoC server 50 user plane step 207 is where the controlling PoC server 50 transmits a 'talk granted' message to the fourth participating PoC server 107. In other embodiments of the present invention the controlling PoC server 50 transmits a 'floor granted' message which is processed by the system in a manner similar to a 'talk granted' message. In the following user plane step 209 the fourth participating PoC server 107 transmits the 'talk granted' message received from the previous step towards the UE4 104. This 'talk granted' message allows the client A to send a talk burst within the group, i.e. to broadcast to the group any message it wishes to send.

In step 251 the first participating PoC server 101 receives the 'floor taken' message from the controlling PoC server 50 including the talking party identity and anonymity request information. The first participating PoC server 101 recognises the anonymity request and removes the identity of the talking party from the 'floor taken' message. The first participating PoC server 101 generates a new 'floor taken' message within this step 251. The first participating PoC server 101 then transmits this new 'floor taken' message containing no identifying features of the user to the UE 130 in user plane step 211.

Similarly but not shown in FIG. 3, the second participating PoC server 103 receives the 'floor taken' message from the controlling PoC server 50 including the talking party identity and anonymity request information. The second participating PoC server 103 recognises the anonymity request and removes the identity of the talking party from the 'floor taken' message. The second participating PoC server 103 generates a new 'floor taken' message. The second participating PoC server 101 then transmits this new 'floor taken' message containing no identifying features of the user to the UE2 44.

The UE3 102 receives the 'floor taken' message from the controlling PoC server 50 containing no identifying features of the initiating user.

In further embodiments of the present invention the token indicating that the user plane messages must pass through the serving participating server 101, 103, 107 can be inserted into other headers of the SIP message. In other embodiments of the present invention an additional header field is inserted into the header.

In other embodiments of the present invention the Uniform Resource Indicator (URI) parameter of the contact header of the SIP message is amended to indicate that the user plane messages pass through the participating PoC server 101, 103, 107.

For example the URI parameter could read

Poc-server="media"

Where the term 'media' provides the indicator. In such an embodiment the lack of the URI parameter, in this specific example 'media', indicates that the server is not in the user plane message path.

In further embodiments of the present invention the controlling PoC server remembers an instance during a user's initialisation where the user requested anonymity. This request can be carried out using the SIP protocols described within IETF RFC 3325 and/or IETF RFC 3323.

In this embodiment the controlling PoC server examines any talk or floor request messages and applies the privacy as requested by the user, i.e. the controlling PoC server transmits a 'floor taken' message as if it had received a 'talk request' message containing an anonymity request.

Thus in such examples the initiation of a PoC session may both request anonymity whilst maintaining that identities are stored on the 'local' participating PoC server 101, 103, 107.

Embodiments of the present invention may use other types of floor control messages or indeed other types of messages to provide the described information. Examples of other types of messages include media messages.

Embodiments of the present invention may further use protocols other than RTCP for transmitting user and control plane messages.

In further embodiments of the present invention, where the controlling server is transmitting to a user equipment serviced by a participating server within an untrusted network, the controlling PoC server carries out the tasks of stripping any identifying feature from the forwarded messages before forwarding the message onto the untrusted network participating server.

In other embodiments of the present invention the user equipment can transmit an anonymous value as the users display name. In these embodiments the system is arranged not to strip the anonymous value but to simply forward the value. Thus the user still maintains their privacy within such a system.

The invention claimed is:

1. A system, comprising:
a first user equipment and a second user equipment configured to communicate over a shared floor;
a controlling server configured to manage the shared floor; and
at least one participating server configured to serve said first user equipment,
wherein the at least one participating server is configured to detect a connection request from said first user equipment, and to insert into the connection request from the first user equipment a token,
wherein the controlling server is configured to detect said token and to route user plane messages via the at least one participating server responsive to said token,
wherein the controlling server is further configured to detect an anonymity request from the second user equipment, and
wherein the controlling server in a mode of operation, responsive to detected the token, is configured to insert into user plane messages from the second user equipment a privacy indication,
wherein in the mode of operation the at least one participating server is responsive to said privacy indication by removing information about the second user equipment from the user plane messages.

2. The system as claimed in claim 1, wherein said token is in a header of the connection request.

3. The system as claimed in claim 2, wherein said token is a character string within the header.

4. The system as claimed in claim 3, wherein said character string is string 'media' within a server header.

5. The system as claimed in claim 3, wherein said character string is string 'media' within a contact header.

6. The system as claimed in claim 1, wherein the first user equipment is configured to initiate the connection request with the second user equipment via said at least one participating server using a first protocol.

7. The system as claimed in claim 6, wherein said first protocol is a session initiation protocol.

8. The system as claimed in claim 1, wherein the first user equipment is configured to communicate over an existing connection with said second user equipment via said at least one participating sewer using a second protocol.

9. The system as claimed in claim 8, wherein said second protocol is a real time control protocol.

10. The system as claimed in claim 9, wherein said user plane messages are transmitted using said second protocol.

11. The system as claimed in claim 1 wherein said communications system comprises a push-to-talk over cellular communications system.

12. The system as claimed in claim 1, wherein the controlling sewer comprises means for storing said inserted token.

13. The system as claimed in claim 1, further comprising:
at least one further participating sewer configured to serve said second user equipment,
wherein the controlling sewer is further configured to detect a second token from the at least one further participating server.

14. The system as claimed in claim 13, wherein in a further mode of operation responsive to not detecting said token the controlling server is configured to remove information about the second user equipment from the user plane messages.

15. An apparatus, comprising:
a first sewer configured to operate in a communications system, wherein said first server is configured to detect a connection request from a first user equipment, and to insert into the connection request from the first user equipment a token configured to be detected and to assist in routing user plane messages via a participating server,
wherein the first sewer is responsive to detecting a privacy indication in a user plane message to remove information about a further user equipment from the user plane message; and
a second sewer configured to detect an anonymity request from the further user equipment and to insert into the user plane message from the further user equipment the privacy indication in response to detection of the token.

16. A method, comprising:
   receiving at a first sewer a connection request;
   inserting a token into the connection request;
   transmitting the connection request comprising the token to a second sewer;
   configuring a routing of user plane messages to pass through the first server responsive to receiving the token; and
   receiving at said second server an anonymity request from said second user equipment, wherein the second server in a mode of operation, responsive to detecting the token, is configured to insert into the user plane messages from the second user equipment a privacy indication,
   wherein the mode of operation of the first server is responsive to said privacy indication by removing information about the second user equipment from the under plane messages.

17. The method as claimed in claim 16, wherein the second server in a further mode of operation removes information about a second user equipment from the user plane message prior to transmitting to a first user equipment when the token is not present at the second server.

18. An apparatus, comprising:
   operating means for operating in a communications system, said communications system further comprising a first user equipment and a second user equipment in communication over a shared floor, and a second server configured to control the shared floor;
   detecting means for detecting a connection request from said first user equipment, and for inserting into the connection request from the first user equipment a token to be detected and to assist in routing user plane messages via a participating server;
   detecting means for detecting a privacy indication in the user plane messages to remove information about the second user equipment from the user plane message; and
   detecting means for detecting an anonymity request from the second user equipment and to insert into user plane messages from the second user equipment a privacy indication in response to detection of the token.

19. The apparatus as claimed in claim 18, wherein the first user equipment is configured to initiate the connection request with the second user equipment via said at least one participating server using a first protocol.

* * * * *